US005561768A

United States Patent [19]
Smith

[11] Patent Number: 5,561,768
[45] Date of Patent: Oct. 1, 1996

[54] SYSTEM AND METHOD FOR PARTITIONING A MASSIVELY PARALLEL COMPUTER SYSTEM

[75] Inventor: Stephen J. Smith, Lynnfield, Mass.

[73] Assignee: Thinking Machines Corporation, Bedford, Mass.

[21] Appl. No.: 853,063

[22] Filed: Mar. 17, 1992

[51] Int. Cl.⁶ .................... G06F 15/173; G06F 15/177
[52] U.S. Cl. .................. 395/200.1; 364/DIG. 1; 364/229; 364/229.41; 364/230; 364/DIG. 2; 364/949.4
[58] Field of Search .................. 395/200, 650, 395/800

[56] References Cited

U.S. PATENT DOCUMENTS

| | | | |
|---|---|---|---|
| 4,644,496 | 2/1987 | Andrews | 395/200 |
| 4,925,311 | 5/1990 | Neches et al. | 395/650 |
| 4,987,536 | 1/1991 | Humblet | 395/200 |

OTHER PUBLICATIONS

Teich et al. "A Transformative Approach to the Partitioning of Processor Arrays", IEEE 1992 pp. 4–20.
Agrawal et al "Partitioning Techniques for Large–Grained Parallelism", IEEE Transacton on Computers, vol. 37, pp. 1627–1634, 1988.

Primary Examiner—Thomas C. Lee
Assistant Examiner—D. Dinh
Attorney, Agent, or Firm—Richard A. Jordan

[57] ABSTRACT

A partition establishment arrangement for use in a computer system comprising a plurality of processors interconnected by a communications network. The communications network comprises a plurality of communications nodes connected in a series of levels, with the nodes of at least some of the levels being controllable to connect to multiple ones of the nodes in a subsequent level. The partition establishment arrangement determines the controlling of the communication nodes to facilitate the partitioning of the processors into a plurality of partitions. The partition establishment arrangement, in a plurality of iterations, identifies conflict sets of processors to be assigned to respective partitions at a level, each conflict set identifying partitions for which, at a selected level, a processor may be connected to the same communications nodes in the next level. In each iteration, a level processing portion determines a control value for controlling the communications nodes in response to the conflict sets identified for the level. The operations continue through each of the successive levels.

2 Claims, 16 Drawing Sheets

| FIG. 3A | FIG. 3B | FIG. 3C |
|---|---|---|

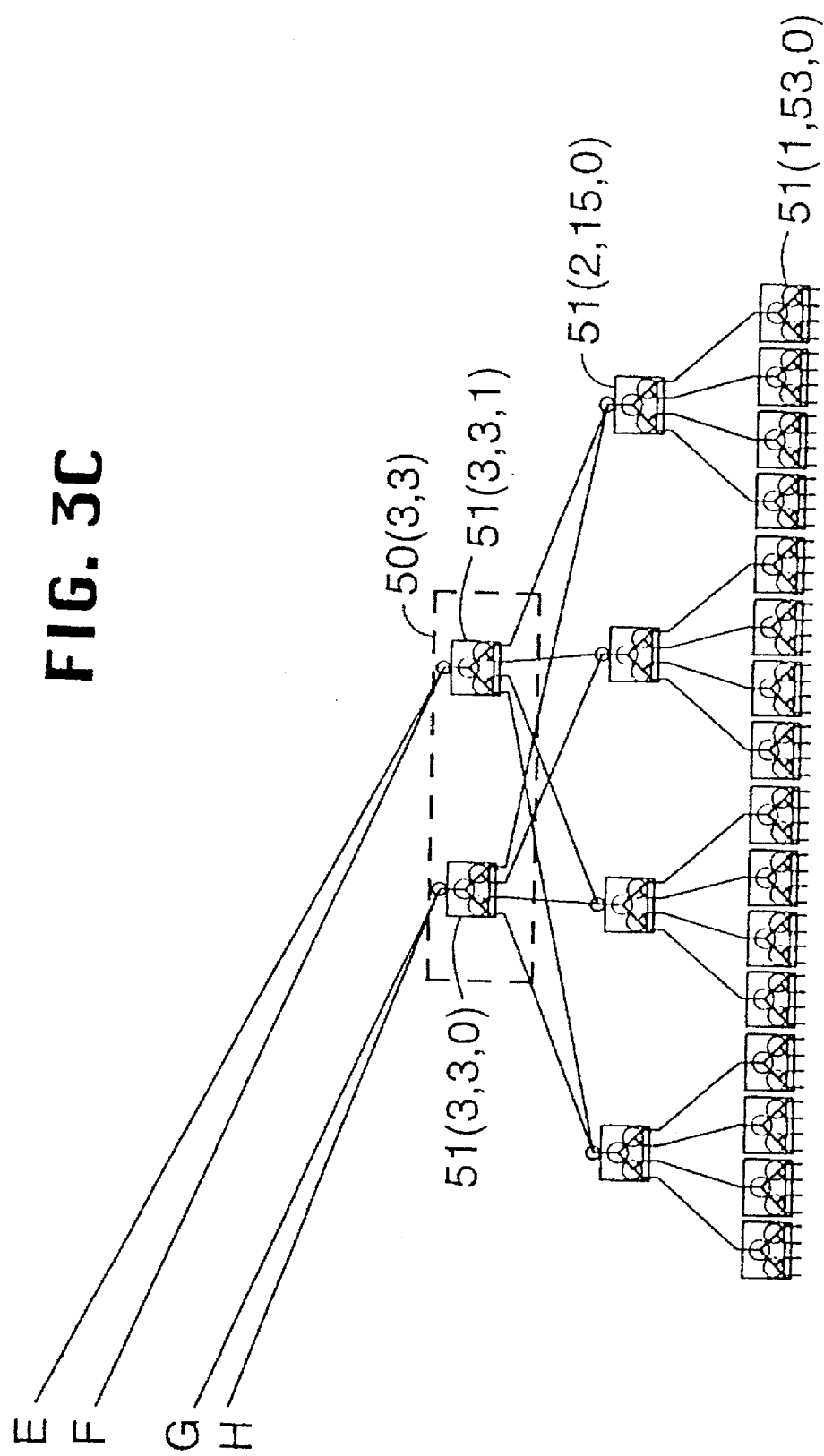

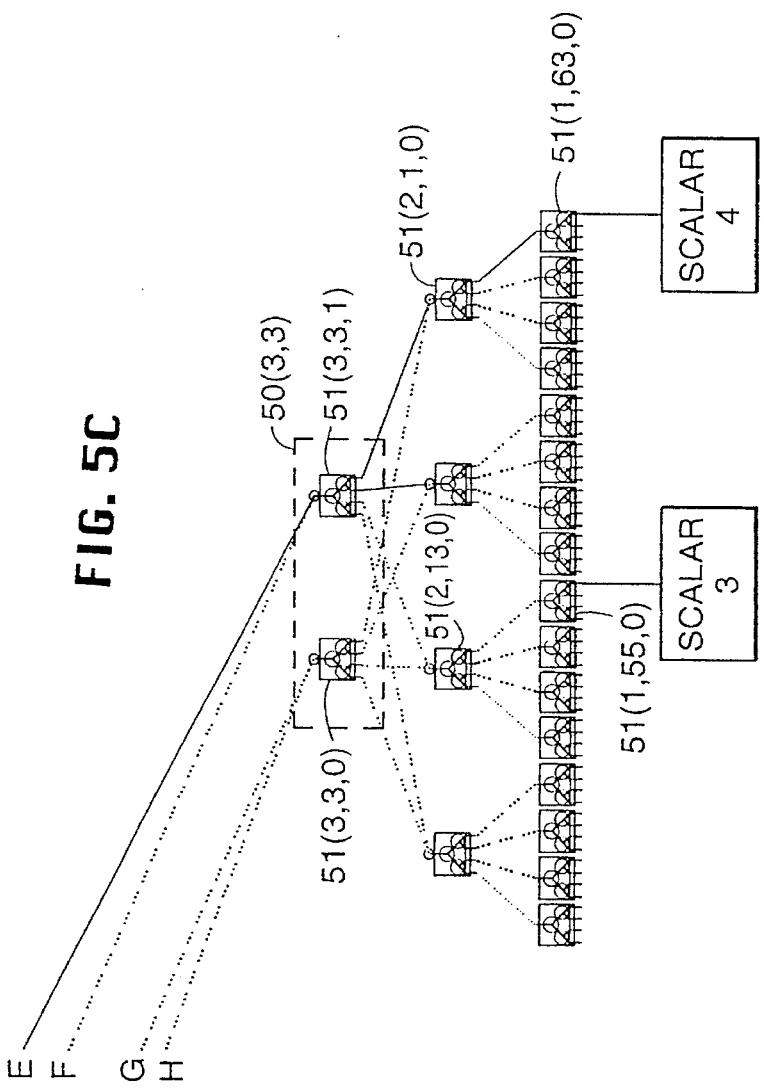

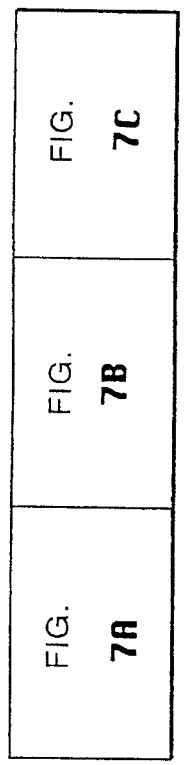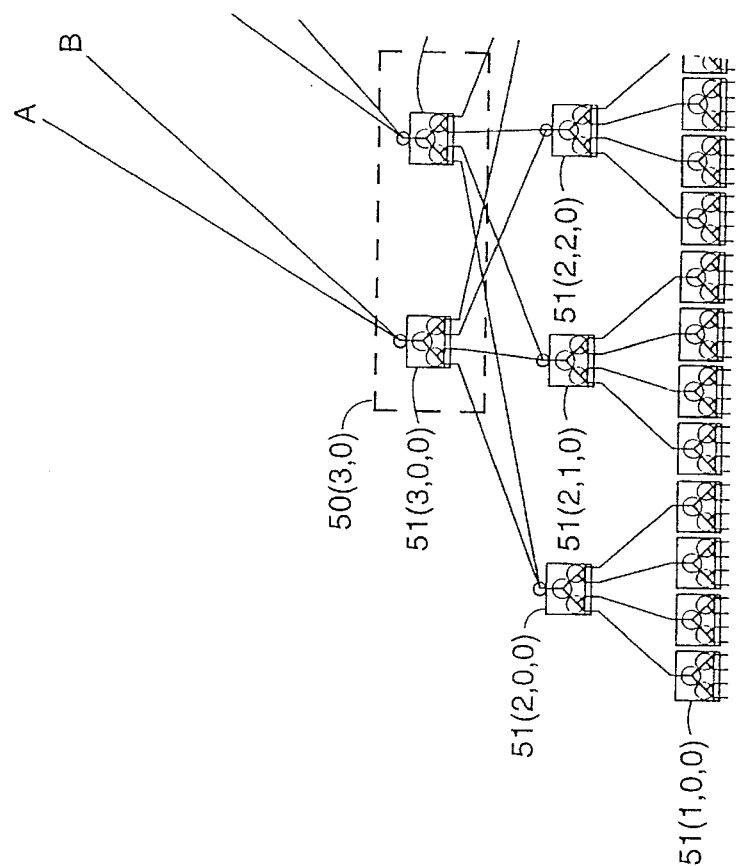
FIG. 6
FIG. 7A

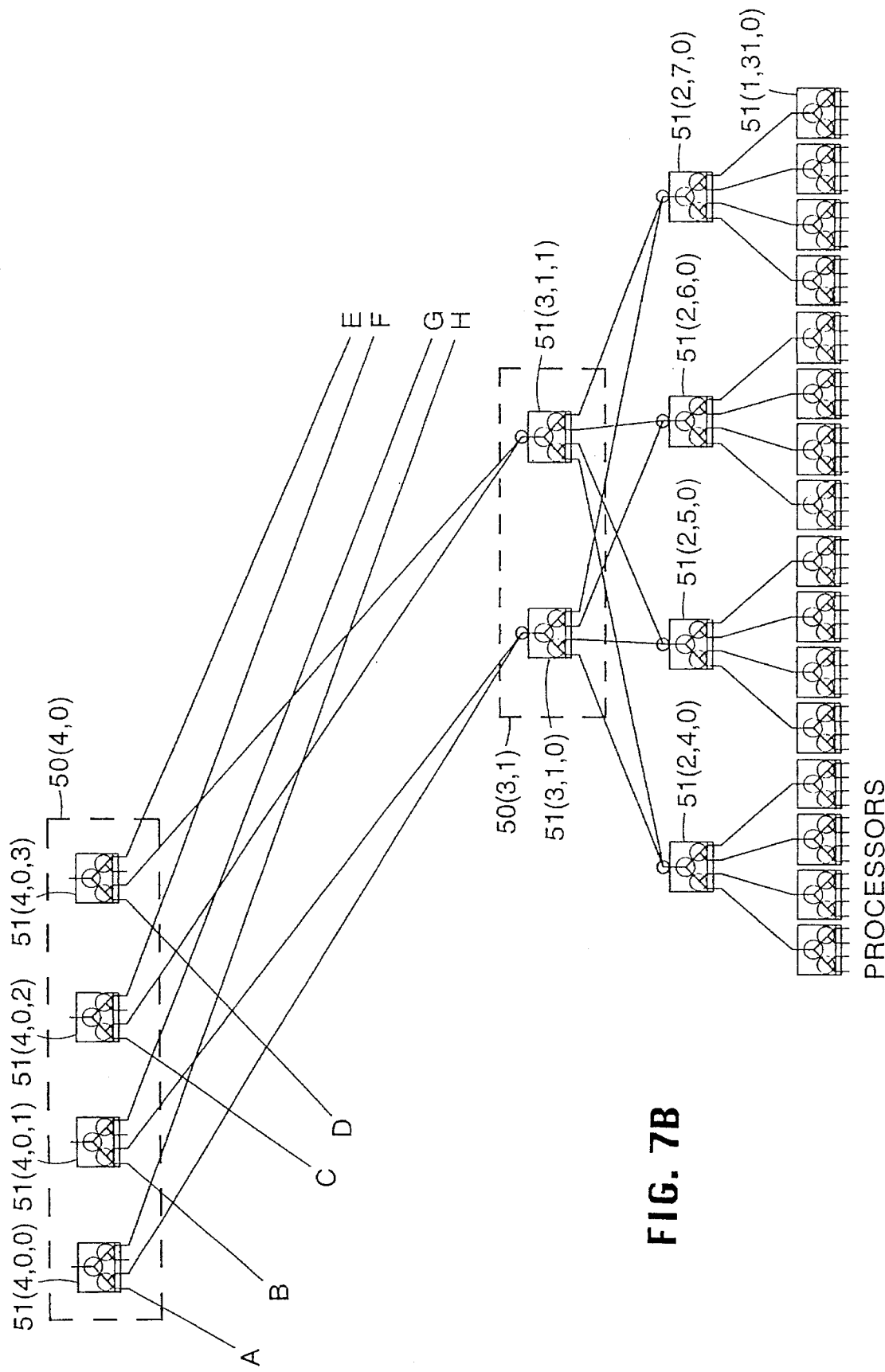

FIGURE 10A

100. ESTABLISH A TERMINATION CRITERION RELATING TO THE NUMBER OF LEVELS IN THE CONTROL NETWORK 14.

101. ESTABLISH AND INITIALIZE A LEVEL COUNTER

102. IDENTIFY ROOT SUB-FAT-TREES AT THE <----------------------
LEVEL IDENTIFIED BY THE LEVEL COUNTER

| G
 (FROM FIG. 10C)

103. FOR EACH ROOT SUB-FAT-TREE, IDENTIFY CONFLICT SETS OF THE RESPECTIVE PARTITIONS

104. ESTABLISH A SET OF CONNECTION IDENTIFICATION TABLE(S), EACH FOR A ROOT SUB-FAT-TREE. EACH CONNECTION IDENTIFICATION TABLE IDENTIFIES, FOR EACH OF THE PROCESSING NODE SECTION AND CONTROL PROCESSOR SECTION, THE CONFLICT SETS OF CONFLICT SETS FOR THE ROOT SUB-FAT-TREE AND OTHER PARTITIONS DIRECTED TO THE ROOT SUB-FAT-TREE WHICH ARE NOT PART OF A CONFLICT SET.

105. SELECT A CONNECTION <----------------------
IDENTIFICATION TABLE FOR WHICH NOT ALL
CONFLICTS HAVE BEEN RESOLVED

| F
 (FROM FIG. 10C)

106. DOES THE SELECTED CONNECTION
NO            IDENTIFICATION TABLE HAVE ANY CONFLICT
----------------------SETS?

| | YES
V   V
B   A
(TO FIG. 10C)   (TO FIG. 10B)

FIGURE 10C (FROM FIG. 10A)　　(FROM FIG. 10B)　　　　　　(TO FIG. 10B)
B　　　　　　　　　C　　　　　　　　　　　　D　　E
|　　　　　　　　　|　　　　　　　　　　　　|　　　|
|　　　　　　　　　V
|　　　　　111. DETERMINE WHETHER THERE ARE ANY
|　　　　　　CONFLICT SETS IN EITHER THE
|　　　NO　　PROCESSING NODE SECTION OR THE
|　　------- CONTROL PROCESSOR SECTION FOR
|　　　|　　WHICH ONE PARTITION HAS A CONNECTION
|　　　|　　IDENTIFICATION AND THE OTHER DOES NOT
|　　　|　　　　　　　　|
|　　　|　　　　　　　　| YES
|　　　|　　　　　　　　V
|　　　|　　112. SELECT ONE CONFLICT SET IDENTIFIED
|　　　|　　IN THE PRECEDING STEP AND ESTABLISH------------
|　　　|　　THE CONNECTION IDENTIFICATION
|　　　|
|　　　---------------------------------
|　　　　　　　　　　|
|　　　　　　　　　　V
|　　　113. HAVE NEXT LEVEL CONNECTION　　NO
|　　　IDENTIFICATIONS BEEN ESTABLISHED FOR--------
|　　　ALL CONFLICT SETS IN THE SELECTED
|　　　TABLE?
|　　　　　　　　　|
------------------------------> | YES　　　　　　(TO FIG. 10A)
　　　　　　　　　V　　　　　　　F　　G
　　114. IF NOT PREVIOUSLY DONE, ESTABLISH
　　NEXT LEVEL CONNECTION IDENTIFICATIONS
　　FOR THE NON-CONFLICTING PARTITIONS IN
　　THE SELECTED CONNECTION
　　IDENTIFICATION TABLE.
　　　　　　　　　|
　　　　　　　　　V
　　115. HAVE NEXT LEVEL CONNECTION　　NO
　　IDENTIFICATIONS BEEN ESTABLISHED FOR-------------
　　CONFLICT SETS IN ALL TABLES?
　　　　　　　　　|
　　　　　　　　　| YES
　　　　　　　　　V
　　116. INCREMENT LEVEL COUNTER.
　　　　　　　　　|
　　　　　　　　　V
　　117. DOES VALUE OF LEVEL COUNTER　　NO
　　CORRESPOND TO TERMINATION-------------
　　CRITERION?
　　　　　　　　　|
　　　　　　　　　| YES
　　　　　　　　　V
　　　　　　118. EXIT

SYSTEM AND METHOD FOR PARTITIONING A MASSIVELY PARALLEL COMPUTER SYSTEM

INCORPORATION BY REFERENCE

U.S. patent application Ser. No. 07/592,029, filed Oct. 3, 1990 now abandoned, in the name of David C. Douglas, et al., entitled Parallel Computer System, assigned to the assignee of the present invention, incorporated by reference (hereinafter, the "Douglas, et al., '029 application").

U.S. patent application Ser. No. 07/746,035, filed Aug. 16, 1991, now U.S. Pat. No. 5,353,412 in the name of David C. Douglas, et al., entitled Massively Parallel Computer Partitionable By A Switchable Fat-Tree Control Network, assigned to the assignee of the present invention, incorporated by reference (hereinafter, the "Douglas, et al., '036 application").

FIELD OF THE INVENTION

The invention relates generally to the field of digital computer systems and more particularly to digital computer systems of the massively-parallel processing type. The invention provides an arrangement for partitioning a massively-parallel computer system, including a number of processing nodes and a plurality of control processors, into a plurality of partitions each including a plurality of processing nodes and at least one control processor.

BACKGROUND OF THE INVENTION

The Douglas '029 and Douglas '036 applications (collectively, the "Douglas, et al., applications) disclose a massively parallel computer system including a number of processing nodes and control processors interconnected by a control network and a data router. Generally, the control processors control and synchronize processing by the processing nodes by means of commands transmitted over the control network. The processing nodes, as well as the control processors, can transfer data over the data router. The system is scalable, that is, the number of processing nodes and control processors can be varied depending on the processing requirements. The system is also partitionable through partitioning of the control network, which provides that commands from a control processor can be transmitted to selected ones of the processing nodes. Partitioning allows a system to process multiple applications concurrently, with each application being processed on a selected number of processing nodes. In addition, partitioning may be used to permit program developers to develop programs on partitions with small numbers of processors, without interfering with production processing on other, larger partitions.

SUMMARY OF THE INVENTION

The invention provides a new and improved arrangement for establishing partitions in a massively parallel computer system.

In brief summary, the partition establishment arrangement is for use in a computer system comprising a plurality of processors interconnected by a communications network. The communications network comprises a plurality of communications nodes connected in a series of levels, with the nodes of at least some of the levels being controllable to connect to multiple ones of the nodes in a subsequent level. The partition establishment arrangement determines the controlling of the communication nodes to facilitate the partitioning of the processors into a plurality of partitions. The partition establishment arrangement, in a plurality of iterations, identifies conflict sets of processors to be assigned to respective partitions at a level, each conflict set identifying partitions for which, at a selected level, a processor may be connected to the same communications nodes in the next level. In each iteration, a level processing portion determines a control value for controlling the communications nodes in response to the conflict sets identified for the level. The operations continue through each of the successive levels.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIGS. 2 through 9 are block and logic diagrams useful in understanding the structure and operation of the control network of the computer system of FIG. 1;

DETAILED DESCRIPTION OF AN ILLUSTRATIVE EMBODIMENT

Figure 1:
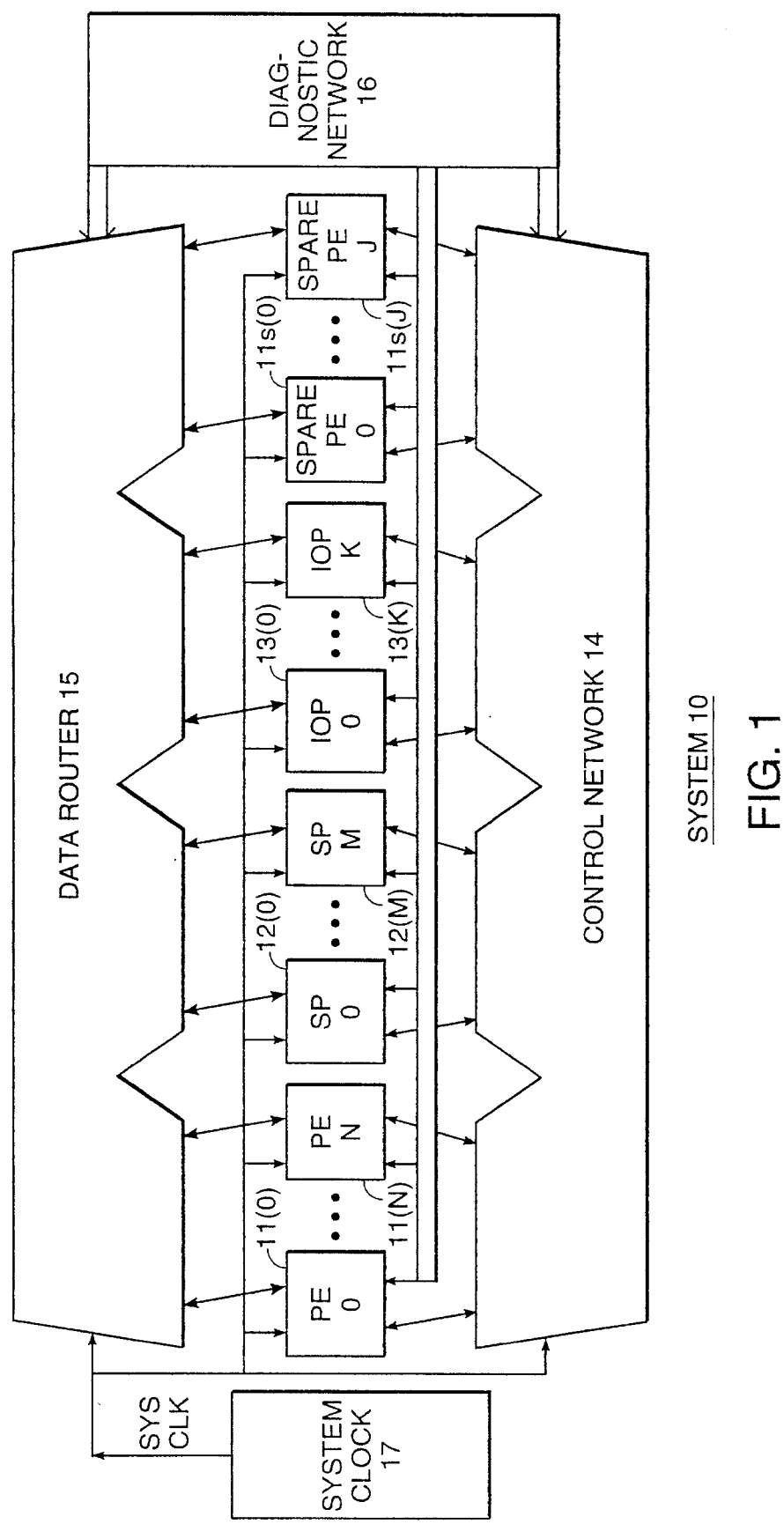
FIG. 1 is a general block diagram of a massively parallel computer system constructed in accordance with the invention.

FIG. 1 is a general block diagram of a massively parallel computer system 10 with which the invention may be used. With reference to FIG. 1, system 10 includes a plurality of processing nodes 11(0) through 11(N) (generally identified by reference numeral 11), control processors 12(0) through 12(M) (generally identified by reference numeral 12) and input/output processors 13(0) through 13(K) (generally identified by reference numeral 13), all of which are described in detail in the aforementioned Douglas, et al, patent applications. The input/output processors 13 control input/output units (not shown), such as, for example, disk and tape storage units, video display devices, printers and so forth may be connected to the input/output processors to supply information, including data and program commands, for processing by the processing nodes 11 and control processors 12 in the system, and may also receive processed data for storage, display and printing. The control processors 12 may also be connected to input/output units including, for example, video display terminals which permit one or more operators to generally control system 10. The system 10 may also include a plurality of spare processing nodes $11s(0)$ through $11s(J)$ (generally identified by reference numeral $11s$).

The system 10 further includes a control network 14, a data router 15 and a diagnostic network 16. The control network 14 permits one or more control processors 12 to broadcast program commands to processing nodes 11. The processing nodes 11 which receive the commands execute them generally concurrently. The control network 14 also permits the processing nodes 11 to generate status information which they may supply to the control processors 12. The control network 14 is also used by the processing nodes 11 to perform selected types of arithmetic operations, termed "scan" and "reduce" operations, as described in the aforementioned Douglas, et al., patent applications. The control network 14 may also be used to provide status and synchronization information among the processing nodes 11. Communications over the control network is also described in detail in the aforementioned Douglas, et al., patent applications.

The data router 15 transfers data among the processing nodes 11, control processors 12 and input/output processors 13. In particular, under control of the control processors 12, the input/output processors 13 retrieve data to be processed from the input/output units and distributes it to the respective control processors 12 and processing nodes 11. During processing, the control processors 12 and processing nodes 11 can transfer data among themselves over the data router 15. In addition, the processing nodes 11 and control processors 12 can transfer processed data to the input/output processors 13. Under control of the control processors 12, the input/output processors 13 can direct the processed data that they receive from the data router 15 to particular ones of the input/output units for storage, display, printing, or the like. The data router 15 in one particular embodiment is also used to transfer input/output commands from the control processors 12 to the input/output processors 13 and input/output status information from the input/output processors 13 to the control processors 12. The data router 15, and communications thereover, are described in detail in the aforementioned Douglas, et al, patent applications, and will not be further described herein.

The diagnostic network 16, under control of a diagnostic processor (not shown in FIG. 1), facilitates testing of other portions of the system 10 to identify, locate and diagnose defects. The diagnostic processor may comprise one or more of the control processors 12, or a separate diagnostic processor (not shown). In addition, the diagnostic network 16 may be used to establish selected operating conditions in the other portions of the system 10 as generally described below. The diagnostic network 16 is described in detail in the aforementioned Douglas, et al., patent applications, and will not be further described herein.

The system 10 is synchronous, that is, all of its elements operate in accordance with a global SYS CLK system clock signal provided by a clock circuit 17.

One particular embodiment of system 10 may include hundreds or many thousands of processing nodes 11 which may operate on a single application in parallel under control of commands broadcast to them by the control processors 12. In that embodiment, the processing nodes 11 operate in parallel on the same command on their individual sets of data, thereby forming a parallel computer system.

In addition, the system 10 may be dynamically logically partitioned, by logical partitioning of the control network 14 as described below, into multiple logical subsystems which may concurrently operate on separate applications or separate parts of a single application. In that case, each partition includes at least one control processor 12 and a plurality of processing nodes 11, the control processor 12 supplying the commands for processing by the processing nodes in its partition. The spare processing nodes 11s, which except for the positions of their connections to the control network 14 and data router 15 are otherwise similar to processing nodes 11, may be used to substitute for failed processing nodes 11 in a partition as described below, to augment the number of processing nodes in a partition if there are insufficient processing nodes 11 to form a partition with a desired number of processing nodes, or to provide additional processing nodes which may themselves be formed into partitions. In the following, unless otherwise stated explicitly, a reference to a processing node 11, in either the singular or plural, will also be taken as a corresponding singular or plural reference to a spare processing node 11s; that is, the processing nodes 11 and spare processing nodes 11s will be jointly referred to herein generally as processing nodes 11.

It should be noted from the following description that the partitioning is performed only in relation to the control network 14; the data router 15 itself is not partitioned. This facilitates transfer of data over the data router 15 between processing nodes of different partitions if they are, for example, processing different parts of a particular application, or, more generally, for inter-process communications, if each processing nodes of the diverse partitions are processing correspondingly diverse, but possibly interacting, processes. This further facilitates transfer of data from processing nodes of any partition to the input/output processors 13 to permit storage or display of data, as well as transfer from the input/output processors 13 of stored data to processing nodes of any partition.

Figures 2, 3A:
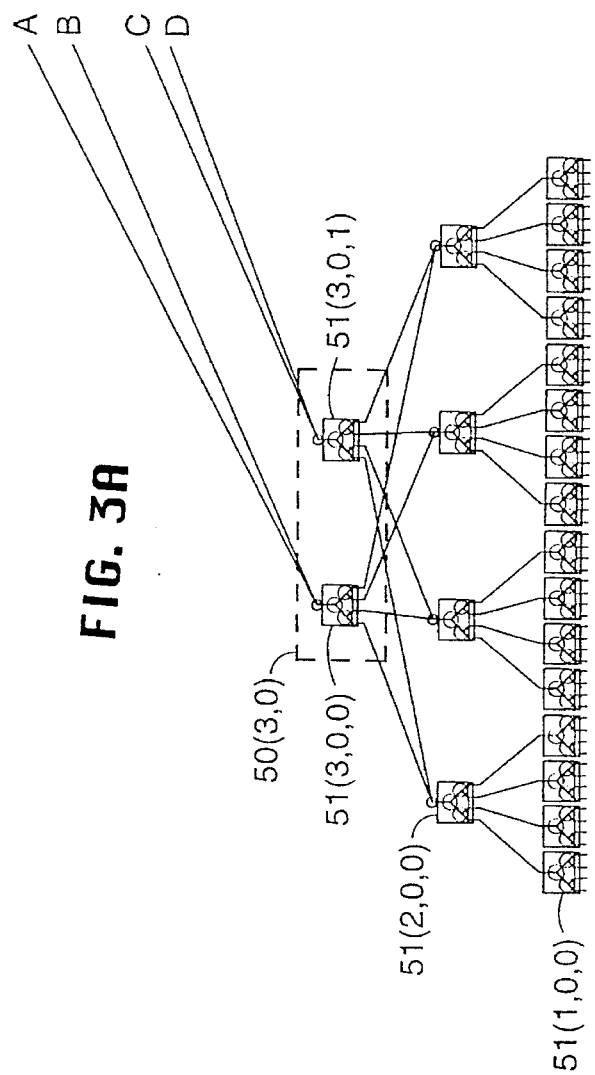

The invention is generally directed to controlling partitioning of the system 10 into a one or more partitions, by partitioning of the control network. By way of background, and with reference to FIGS. 2 through 7C, the control network 14 comprises a plurality of control network node clusters generally identified by reference numeral 50(i,j) (where indexes "i" and "j" are both integers) organized in a tree structure extending in a plurality of levels from a lower level, having a height value "1," which is connected to the processing nodes 11, control processors 12 and input/output processors 13, through a plurality of intermediate levels to an upper root level having a height value "M." In the indices "i" and "j" in reference numeral 50(i)0) identifying the control network node clusters 50(i,j), the index "i" identifies a height value for the level, and index "j" identifies each particular control network node cluster within the series of control network node clusters within the particular level "i." The processing nodes 11, control processors 12 and input/output processors 13 effectively form leaves of the tree comprising the control network node clusters 50(i,j). In the portion of the control network 14 depicted in FIGS. 3A through 3C, which the leaves comprise processing nodes 11 and control processors 12, the processing nodes are connected to the left half of the control network node clusters 50(1,j), namely, control network node clusters 50(1,0) through 50(1,31), while the control processors are connected to the right half of the control network node clusters 50(1,j), namely, control network node clusters 50(1,31) through 50(1,63). The sub-tree including control network node clusters 50(1,0) through 50(1,31), which has a logical root at control network node cluster 50(M-1,0) and is connected to the processing nodes 11, will be referred to as the "processing node portion" of the control network 14. On the other hand, the sub-tree including control network node clusters 50(1,32) through 50(1,63), which has a logical root at control network node cluster 50(M-1,1), and is connected to the control processors, will be referred to as the "control processor portion" of the control network 14.

Each control network node cluster 50(i,j) above the lowest level is connected to receive communications from, and transmit communications to, one or more "child" control network node clusters 50(i−1,j'), 50(i−1,j'+1) . . . in the next lower level. Similarly, each control network node cluster 50(1, j) in the lowest level is connected to receive communications from, and transmit communications to one or more processing nodes 11, control processors 12 or input/output processors 13 having similar index relationships. In a similar manner, each control network node cluster 50(i,j) below the root level is connected to receive communications from, and transmit communications to, one "parent" control network node cluster 50(i+1,j") in the next higher level. The control network node cluster 50(M,0) at the root level has no parent, but it is the parent of the control network node clusters 50(M−1,j) at the next lower level. It will be appreciated that the "child" and "parent" relationships are relative, since each control network node cluster 50(i,j) (index "i" greater than "1" and less than "M") in the intermediate levels is both (a) a parent of one or more of its child control network node clusters 50(i−1,j') at the next lower level "i−1," and (b) a child of its parent control network node cluster 50(i+1,j") at the next higher level "i+1."

The relationship between indices "j" and "j'" for each control network node cluster and its child, and the relationship between indices "j" and "j''" for each control network node cluster and its parent, depends on the fan-in of clusters between levels from one level to the next higher level, that is, the number of child control network node clusters 50(i−1,j') at a level "i−1" which communicate with each control network node cluster 50(i,j) of the next higher level. In one embodiment, that number is generally four, in which case the relationship between indices "j" and "j'" for the series of four child control network node clusters 50(i−1,j') is generally $$j'=j*4+\{0,1,2, \text{ or } 3\} \qquad [\text{Eqn. 1}]$$

and correspondingly, the relationship between the indices "j" and "j''" for a control network node cluster 50(i,j) and its parent 50(i,j'') is generally:

$$j''=GI[j/4] \qquad [\text{Eqn. 2}]$$

where "GI" refers to the "greatest integer in" function, and braces "{" and "}" indicate that any of the enclosed values may be selected.

Each control network node cluster includes one or more control network node groups 51(i,j,k) (indices "i," "j" and "k" representing integers) each represented on FIGS. 2 through 7C by a box, with the boxes in levels at heights two to "M−1" being topped by a bubble. In the indices "i," "j" and "k" in reference numeral 51(i,j,k) for a control network node group, the indices "i" and "j" have the same values and import as the corresponding indices of the reference numeral for the control network node cluster in which the control network node group is included. The index "k" in the reference numeral 51(i,j,k) for a control network node group uniquely identifies the control network node group within the set of control network node groups which form a control network node cluster 50(i,j). The number of control network node groups 51(i,j,k) within each control network node cluster depends upon the height of the cluster's level "i." In the lower level, or a selected number of lower levels, in which index "i" is at or below a predetermined value "I," each control network node cluster 50(i,j) includes one control network node group 51(i,j,k). However, for control network node clusters 50(i,j) above that predetermined level "I," the number of control network node groups 51(i,j,k) in each control network node cluster 50(i,j) increases monotonically with increasing levels, and the connections establishing the control network 14 as a "fat-tree." In one embodiment, the value of "I" is two, so that each control network node cluster 50(i,j) in levels in which index "i" equals one or two contains one control network node group 51(i,j,k).

On the other hand, for control network node clusters 50(i,j) in levels in which index "i" is greater than two, the number of control network node groups 51(i,j,k) in each cluster is at least as great, and may be greater than, the number of control network node groups 51(i−1,j4,k') in the next lower level "i−1." The index "k" in reference numeral 51(i−1,j',k') is an integer uniquely identifying a control network node group within the control network node cluster 50(i−1,j'). Each control network node group 51(i,j,k) in a control network node cluster 50(i,j) in a level "i" is connected to a selected number of control network node groups 51(i+1,j,k) in its parent control network cluster 50(i+1,j'), with no two control network node groups 51(i,j,k) in the cluster 50(i,j) being connected to the same control network node group 51(i+1,j',k') in the parent cluster 50(i+1,j').

The value of index "k'" is related to "k" in the reference numeral for a control network node cluster 50(i,j) in a manner depending on the fan-out of the control network node groups 51(i,j,k) going up the tree from one level at height "i" to the next level at height "i+1." In one embodiment, the fan-out is a uniform two from one level to the next higher level, that is each control network node group 51(i,j,k) at level "i" is connected to two control network node groups 51(i+1,j',k') at the next higher level "i+1", in which case:

$$k'=2k+\{0 \text{ or } 1\} \qquad [\text{Eqn. 3}]$$

where the braces have the same meaning as in Eqn. 1.

As described above, the boxes representing control network node groups 51(i,j,k) in levels at heights two to "M−1" are shown in FIGS. 2 through 7C with bubbles mounted atop their upper edges. Each bubble represents a multiplexer/demultiplexer 53 (i,j,k) (indices "i," "j" and "k" representing integers), which controls communications between the control network node group 51(i,j,k) to which it is adjacent and a selected one of the two control network node groups 51(i+1,j',k') in the next higher level. The multiplexer/demultiplexers 53(i,j,k) are controlled to form diverse flat tree networks within the control network 14, with each tree including at least one leaf 21 comprising a control processor 12 and a plurality of leaves 21 comprising processing nodes 11. In one embodiment, the multiplexer/demultiplexers are controlled by the diagnostic network 16, as described in the aforementioned Douglas '036 application. The formation of diverse flat tree networks will be described in connection with FIGS. 2 through 5C. Effectively, the diagnostic network 16 conditions selected multiplexer/demultiplexers 53(i,j,k) to establish a connection between its associated control network node group 51(i,j,k) and one of the two control network node groups 51(i+1,j,k) in the next higher level to which it is connected. The multiplexer/demultiplexers 53(i,j,k) of the control network node groups so conditioned are selected to form, within the switched fat-tree structure forming control network 14, a flat tree network structure including a control processor 12 and a plurality of processing nodes 11, with each tree thus formed defining a partition. Each flat tree that is formed to create a partition includes one control network node group 51(i,j,k) within those of the control network node clusters 50(i,j) required to form a tree including the processing nodes 11 and control processor 12 to be included in the partition, as well as any input/output processors 13 and spare processing nodes 11s to be included.

Figure 5A:
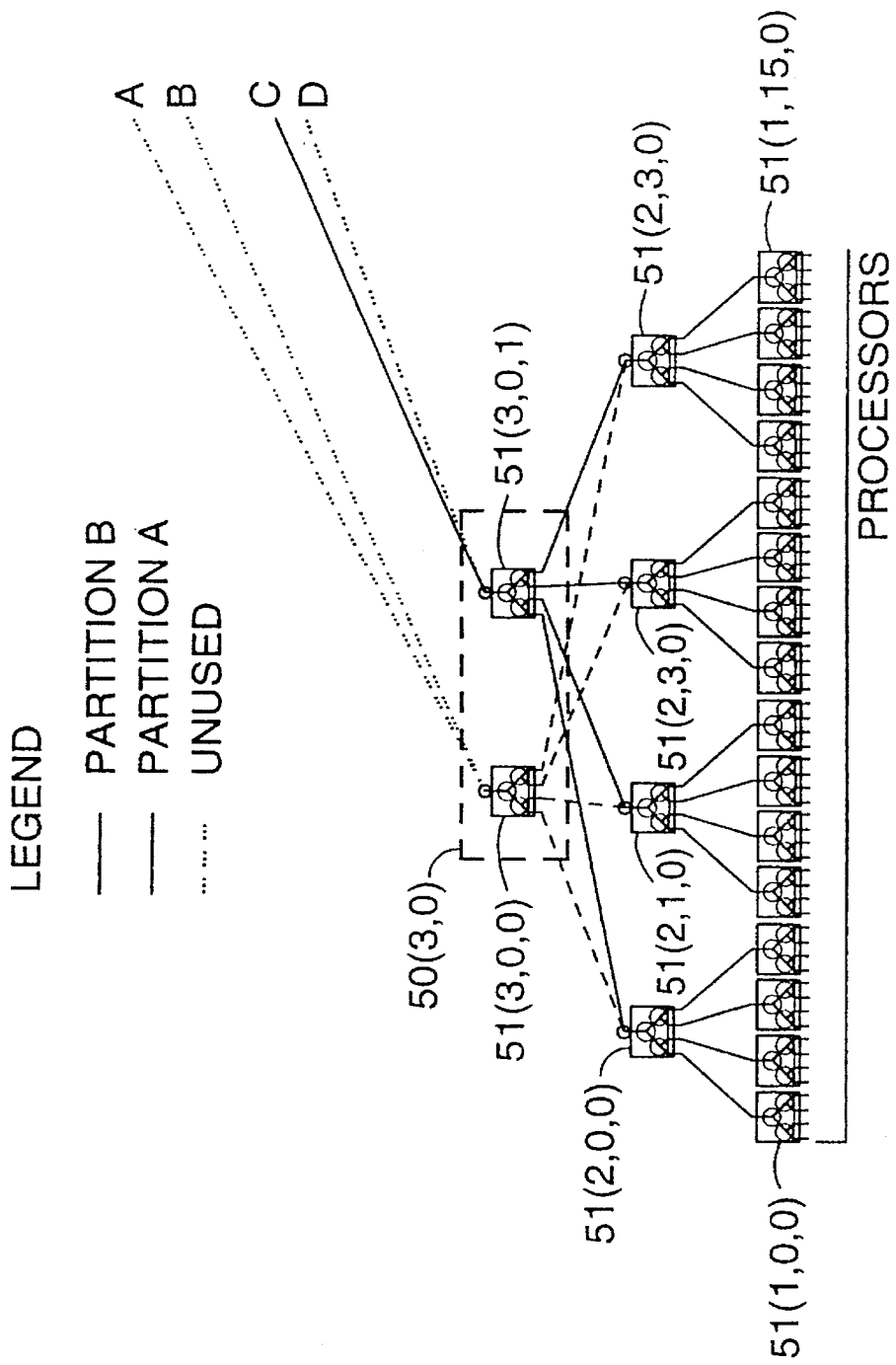
Figure 5B:
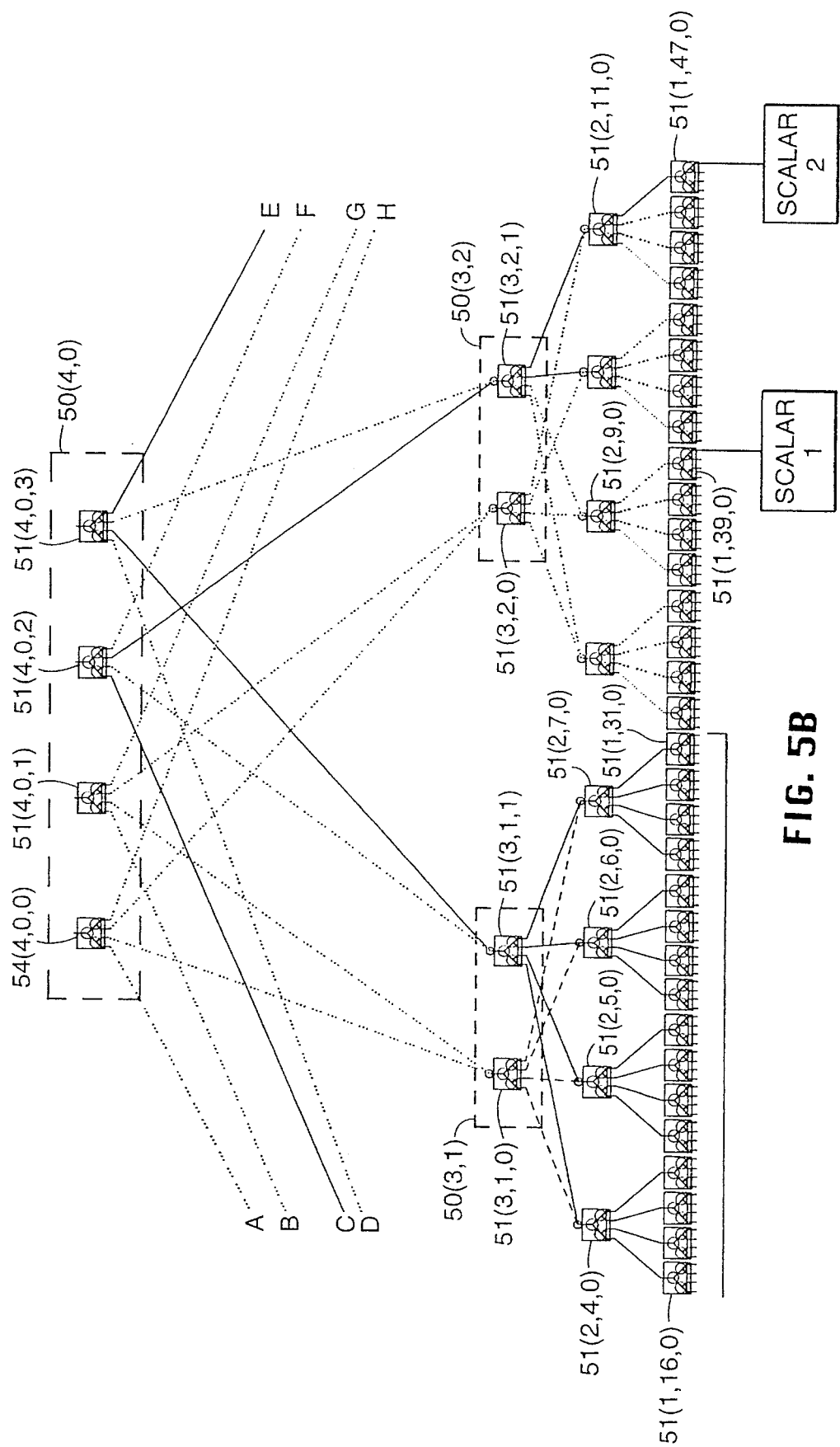

FIGS. 5A through 5C, when put together as shown in FIG. 4, together depict a portion of the control network 14 in which connections defining two partitions have been established, one including control processor 12 identified as "Scalar 2" and the other including control processor 12 identified as "Scalar 4." To form the partition including the Scalar 4 control processor, the multiplexer/demultiplexers 53(i,j,k) are conditioned to establish the connections among control network node groups 51(i,j,k) as depicted in heavy solid lines. Similarly, to form the partition including Scalar 2, the multiplexer/demultiplexers 53(i,j,k) are conditioned to establish the connections among control network node groups 51(i,j,k) as depicted in light solid lines. The other lines interconnecting the control network node groups 51(i, j,k) are depicted in broken lines.

It will be appreciated that the interconnections among the control network node groups 51(i,j,k) to establish each partition establishes a tree of control network node groups. In the tree established for the partition including the Scalar 4 control processor 12, the root node comprises control network node group 51(4,0,3) in level 4, and connections are established through the respective multiplexer/demultiplexers 53(i,j,k) to include control network node group 51(3,1,1) in level 3, control network node groups 51(2,4,0) through 51(2,7,0) in level 2 and control network node groups 51(1, 16,0) through 51(1,31,0) in level 1. This partition includes the processing nodes 11 (not shown) which are connected to control network node groups 51(1,16,0) through 51(1,31,0). In addition, connections are established through the respective multiplexer/demultiplexers 53(i,j,k) to include control network node group 51(3,3,1) in level 3, control network node group 51(2,15,0) in level 2 and control network node group 51(1,63,0) in level 1, to provide an interconnection from scalar 4 to the root node 51(4,0,3) in level 4.

Similarly, in the tree established for the partition including the Scalar 2 control processor 12, the root node comprises control network node group 51(4,0,2) in level 4, and connections are established through the respective multiplexer/demultiplexers 53(i,j,k) to include control network node group 51(3,0,1) in level 3, control network node groups 51(2,0,0) through 51(2,3,0) in level 2 and control network node groups 51(1,0,0) through 51(1,15,0) in level 1. This partition includes the processing nodes 11 (not shown) which are connected to control network node groups 51(1, 0,0) through 51(1,15,0). In addition, the connections are established through the respective multiplexer/demultiplexers 53(i,j,k) to include control network node group 51(3,2,1) in level 3, control network node group 51(2,11,0) in level 2 and control network node group 51(1,47,0) in level 1, to provide an interconnection from scalar 4 to the root node 51(4,0,2) in level 4.

Figure 3B:
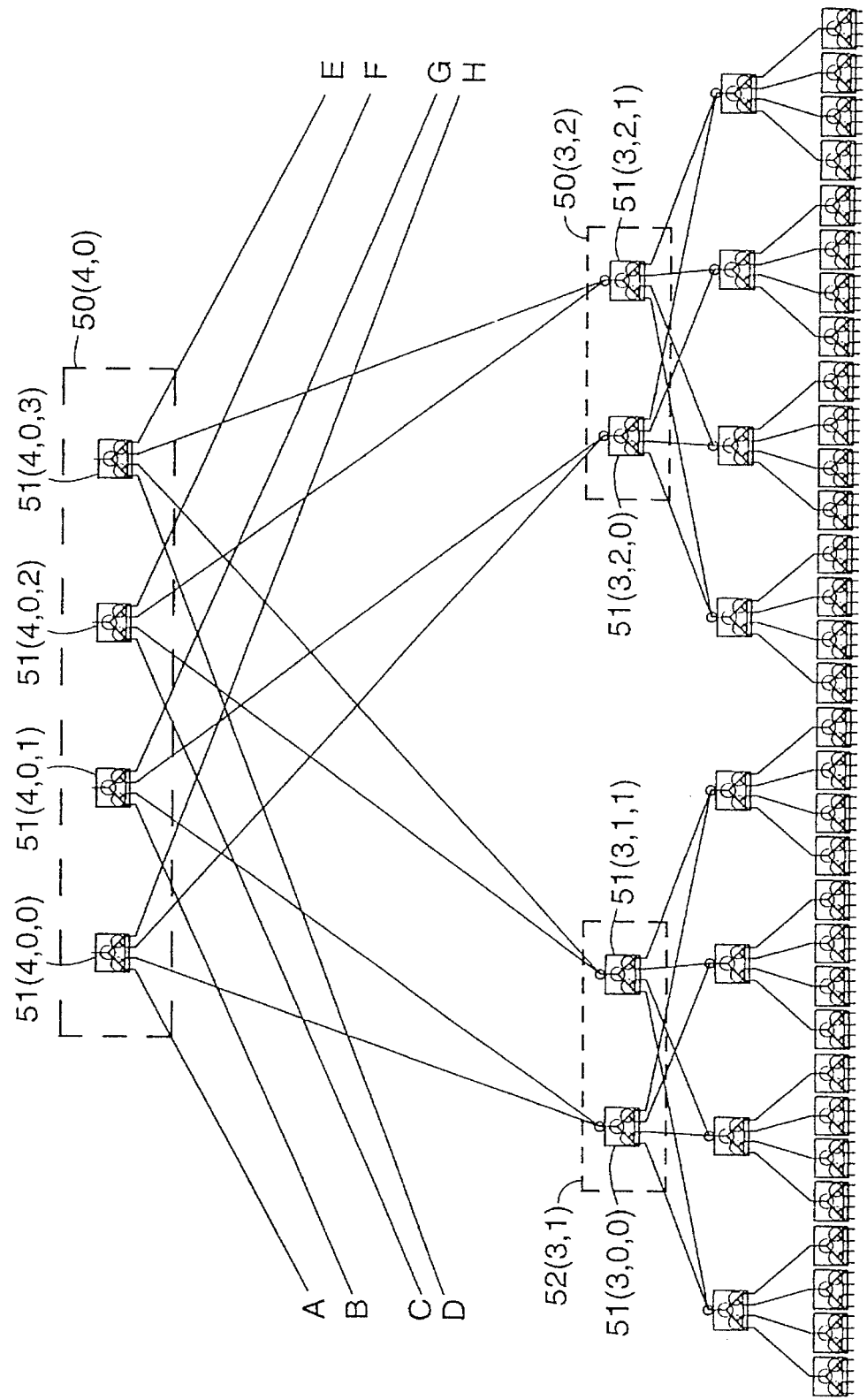

Although not shown in FIGS. 2 through 5C, as described above in connection with FIG. 1, the system 10 also includes input/output processors 13 and spare processing nodes 11s, which may be connected to, for example, control network node groups 51(1,j,k) of higher index "j" than is shown in FIGS. 3B and 5B. In that case, additional levels of control network node clusters 50(i,j) will also be provided to connect the control network node groups 51(i,j,k) of higher index "j" to the control network node groups 51(i,j,k) shown in the FIGS. A partition may be created including these components by establishing a root control network node group at a higher level, and conditioning the paths from the root node to the required processing nodes 11, spare processing nodes 11s, control processor 12 and input/output processors 13.

Figure 7C:
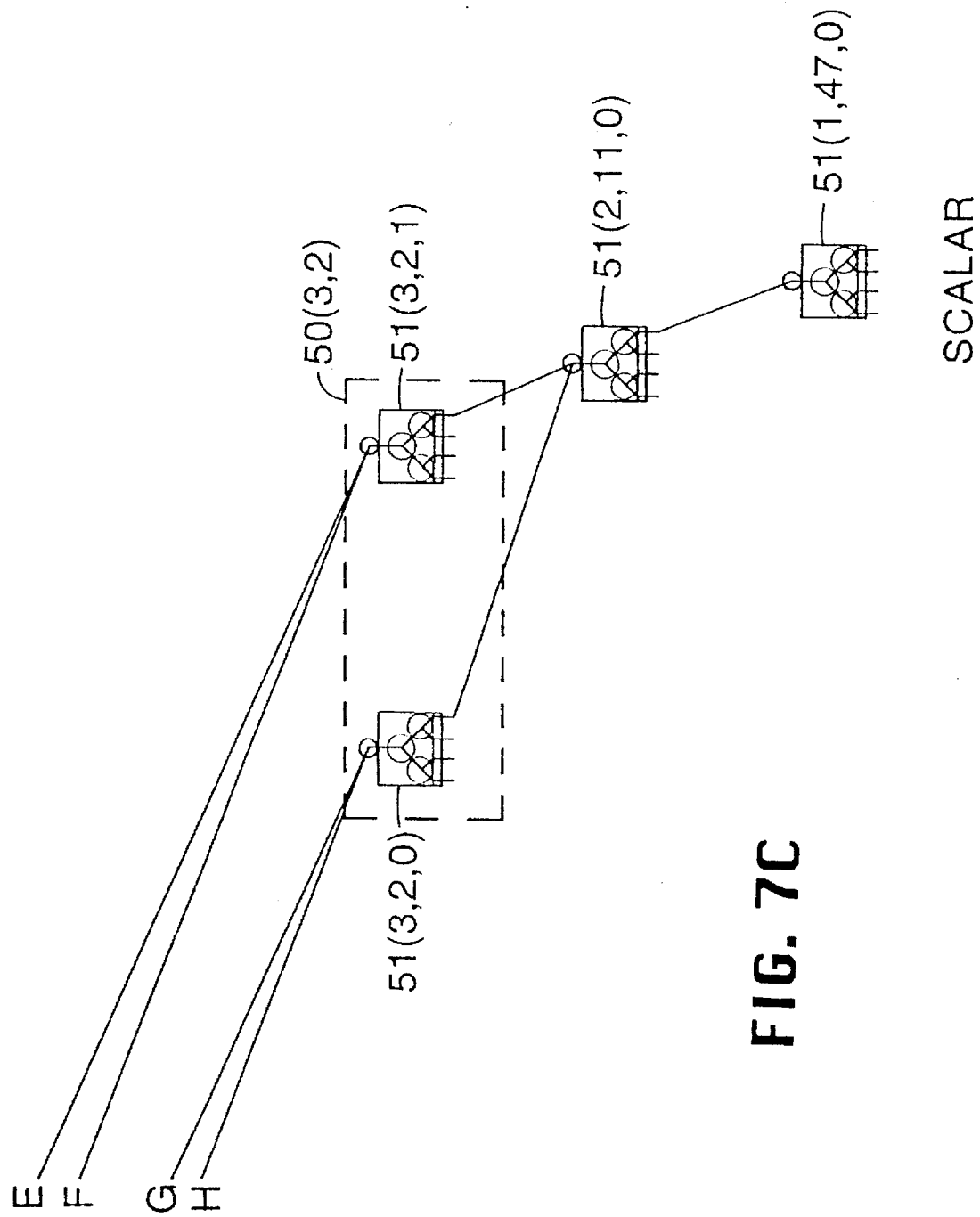

One particular embodiment of the system 10 comprises far fewer control processors 12 than, for example, processing nodes 11. As shown in FIGS. 2 through 5C, in the section of the fat-tree comprising the control network 14 to which the control processors 12 are connected, control processors 12 are not connected to every child connection from the first-level control network node groups 51(1,j,k). In that case, the control network node groups 51(i,j,k) for which there is no connection to a control processor 12 need not be provided, as is shown in FIGS. 6 through 7C. FIGS. 7A through 7A, when put 7C, when put together as shown in FIG. 6, depict a section of the portion of the control network 14 depicted in FIGS. 2 through 5C, specifically including all control network node groups 51(1,0,0) connected to processing nodes 11, and control network node groups 51(1, 47,0), 51(2,11,0), and 51(3,2,1 ) that are necessary to interconnect the Scalar 2 control processor 12 and the control network node cluster 50(4,0). As depicted in FIGS. 7A through 7C, the control network node groups 51(1,40,0) through 51(1,46,0) in the first level, none of which are not connected to a control processor 12, and control network node group 51(2,10,0) in the second level, which would be connected only to the control network node groups 51(1,40, 0) through 51(1,46,0) in the first level, are not provided. Similarly, control network node groups 51(i,j,k) need not be provided in connection with other types of leaves 21 if specific leaves are not provided in the system 10.

Figure 10:
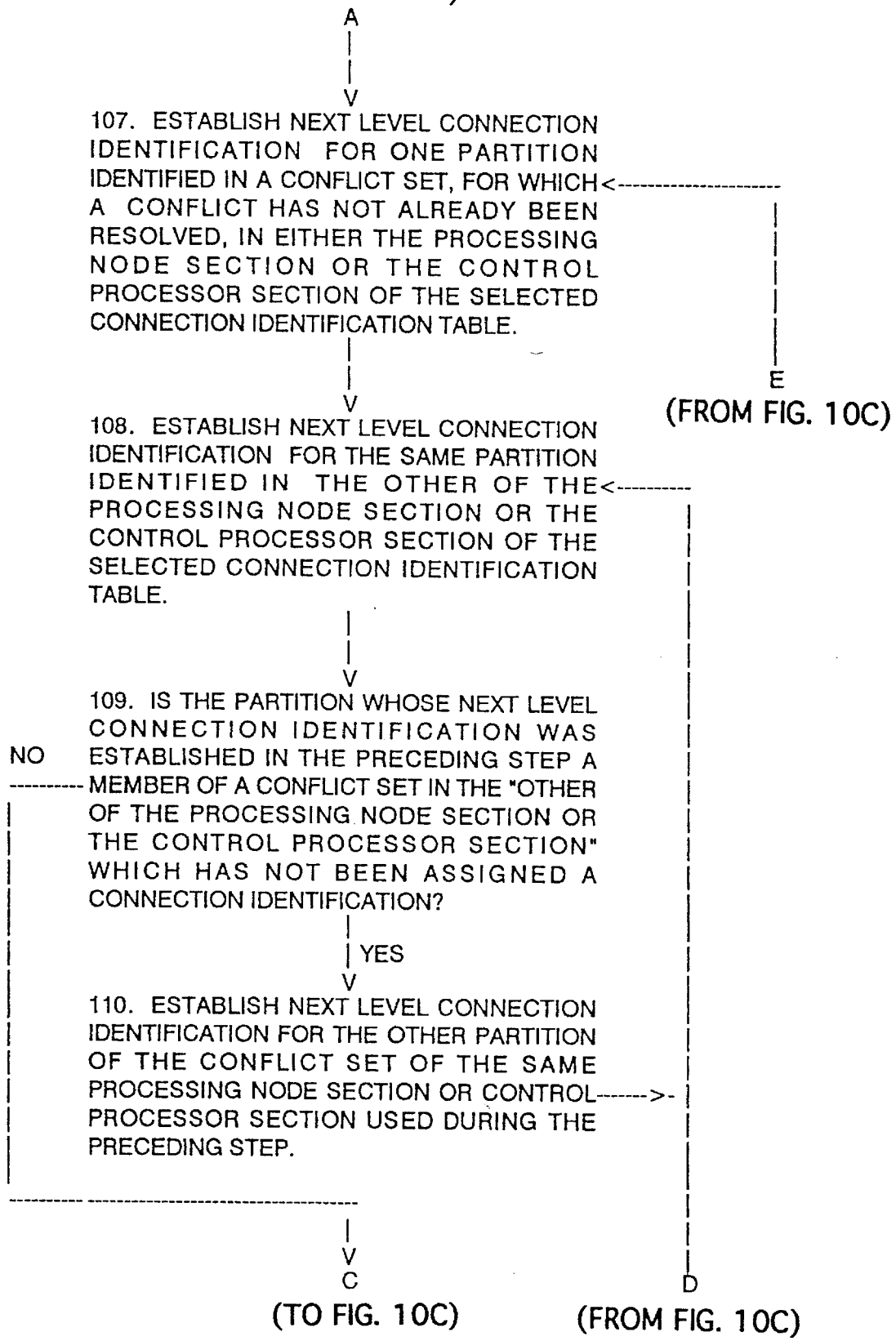
FIGS. 10A through 10C are flow diagrams useful in understanding the operation of the partition establishment arrangement.

With this background, the invention provides an arrangement and method for selecting the conditioning of the multiplexer/demultiplexers 53(i,j,k) at each level to establish the partitioning of the system 10 (FIG. 1) The partitioning arrangement and method may be used to initially establish the various partitions when the system 10 is initially energized, and it may also be used to establish a new partition in response to a request from a control processor 12 from processing nodes 11 which are not then assigned to a particular partition. The partitioning arrangement implements an iterative method, which will be described below in connection with FIGS. 10A through 10C, for determining, at each level in the control network, whether, for a particular partition the multiplexer/demultiplexers 53(i,j,k) should be conditioned to direct communications between the associated control network node group 51(i,j,k) and the control network node group 51(i+1,j',k') in the next higher level which has either an even-valued or odd-valued index k'. The determination is made in response to several constraints, which will also be described below. The result, after application of the method at each level up to the root level, is a set of connection arrangements for controlling the multiplexer/demultiplexers 53(i,j,k) at each level to enable the establishment of the various flat-tress within the control network 14 to thereby establish the required partitions.

Figure 8:
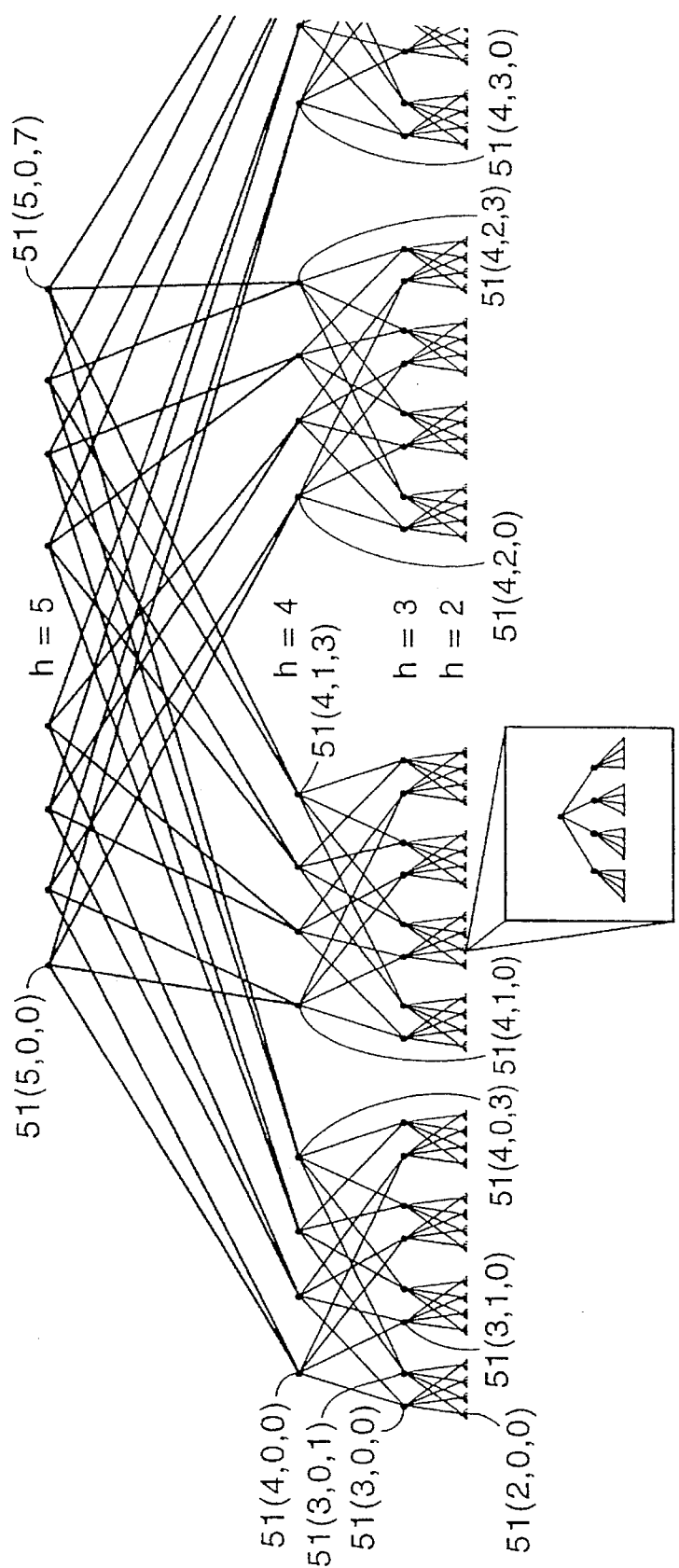
Figure 9:
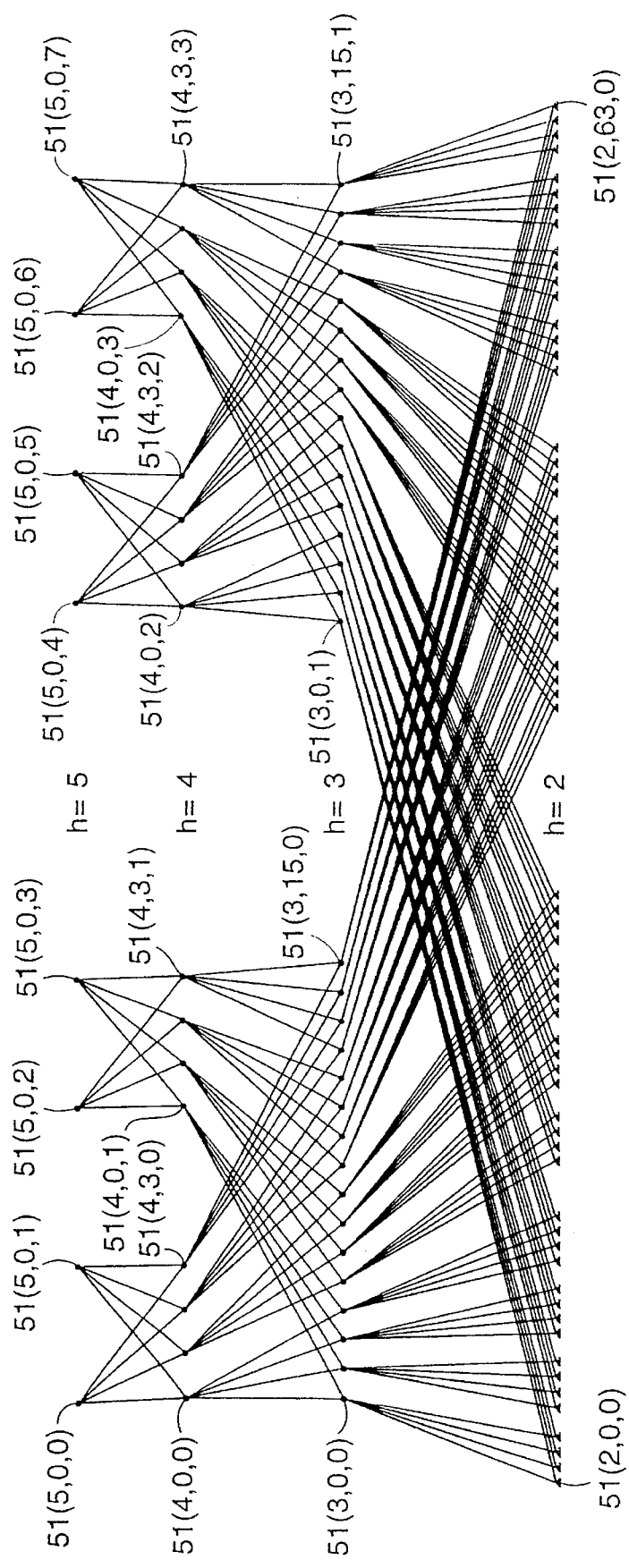

Before describing the partitioning arrangement in detail, it would be helpful to further elucidate the description of the control network 14, as well as the constraints on partitioning as noted above. FIGS. 8 and 9 depict a schematic representation of a portion of the control network 14, the portion comprising levels at heights 2 through 5. Since the control network node groups 51(1,j,k) in level 1, the processing nodes 11 and control processors 12 do not include the multiplexer/demultiplexers 53(i,j,k) which determine the establishment of the partitions, they will not be described further. In FIGS. 8 and 9, the control network node groups 51(i,j,k) are each represented by a dot. FIG. 8 depicts the control network 14 in a "leaf major" view, in which control network node groups 51(i,j,k) comprising the same control network node duster 50(i,j) are proximate to each other in the two-dimensional view shown in the FIG. As a result, in FIG. 8, the control network node groups 51(i,j,k) in each level "i" are grouped so that the odd and even values of the "k" index are intermixed across the level from right to left.

FIG. 9, on the other hand, depicts the control network 14 in a "root major" view, in which, for a given level, all control network node groups 51 (i,j,k) which have a common root control network node group 51(M,0,k") (in FIGS. 8 and 3B, "M" equals five) are depicted proximate to each other in the FIG. In this arrangement, the control network node groups 51(i,j,k) in each level "i" with like values of "k" are grouped together, with successive nodes from right to left having successive values of "j" within each group. As shown in the root-major view of FIG. 3, each control network node group 51(M,0,k) in the root level M forms the root control network node group of what will be referred to herein as a root sub-fat-tree, which includes, at each level "i," a set of control network node groups 51(i,j,k). In addition, sets of the control network node groups 51(i,j,k) at a level "i," with the same value of index "k" effectively form leaves, in a relative sense, of root sub-fat-trees. For example, at level three, control network node groups 51(3,0,0) through 51(3,15,0), shown on the left in FIG. 9, form the leaves of one root sub-fat-tree, of which control network node groups 51(5,0,0) through 51(5,0,3) are the root nodes. In addition, control network node groups 51(3,0,1) through 51(3,15,1), shown to the right in FIG. 9, form a second root sub-fat-tree, of which control network node groups 51(5,0,4) through 51(5,0,7) are the root nodes. Since the control network 14 described herein has a fan-out factor of two, at level four there are four root sub-fat-trees, respectively having as leaves:

(1) control network node groups 51(4,0,0) through 51(4,3,0), (2) control network node groups 51(4,0,1) through 51(4,3,1), (3) control network node groups 51(4,0,2) through 51(4,3,2), and (4) control network node groups 51(4,0,3) through 51(4,3,3).

Since fan-out of the control network 14 begins from level two, all of the control network node groups 51(2,0,0) through 51(2,63,0) form the leaves of one single root sub-fat-tree. The control network node groups 51(i,j,k) forming the leaves of diverse root sub-fat-trees at each level can be identified by the different values of index "k" in the respective reference numerals.

There are two general configuration rules to be used establishing partitions in the control network 14, which if observed will always guarantee that connections can be established by the multiplexer/demultiplexers 53(i,j,k) to establish the partitioning. First, if a control network node cluster 50(i,j) is considered the root of a sub-tree within the control network 14, that sub-tree cannot have more partitions than the number of control network node groups 51(i,j,k) in the control network node cluster 50(i,j). This follows from the fact that each partition will have either (1) a separate root control network node group 50(i,j,k) if the control network node cluster 50(i,j) is at the root level "M," or (2) a separate path, through a separate control network node group 51(i,j,k) in a control network node cluster 50(i,j) which is not at the root level "M," to a control network node group i51(M,0,k) in the root level.

The second partitioning configuration rule is that, for each partition comprising a series of processing nodes 11, if a partition is to include a series of processing nodes 11(x) through 11(y) "x" and "y" being integers), the control network node cluster 50(i,j) which is the least common ancestor of all of these processing nodes in the partition (which cluster is termed herein a "relative root") should not have as children control network node clusters 50(i−1,j') which are themselves relative roots of sub-trees which have processing nodes from this partition as well as other partitions. As an example, a control network node cluster 50 (I,j) at level "I" is a relative root of the sub-tree which includes the aforementioned series of processing nodes 11(x) through 11(y) in a particular partition. In that case, the second partitioning configuration rule will be satisfied if that control network node cluster 50(I,j) connects to child control network node clusters 50(I−1,j'), where j'=j*4+0, 1, 2, or 3 (as described above in connection with Eqn. 1) which are themselves the relative roots of sub-trees which do not contain mixtures of processing nodes from the series 11(x) through 11(y) and processing nodes from other partitions. It will be appreciated that the configuration rule will be satisfied if one or more of the child control network node clusters 50(I−1,j') is the relative root of a sub-tree which includes mixtures of processing nodes from other partitions, as long as the sub-trees do not include processing nodes from the series 11(x) through 11(y), although it will also be appreciated that the second partitioning configuration rule will also have to be satisfied with respect to those other partitions.

It will be appreciated that partitioning may be accomplished in certain instances or special arrangements or assignments of particular series of processing nodes 11 or control processors 12 to partitions even if the second partitioning configuration rule, in particular, is not observed. However, if both partitioning configuration rules are observed, the partition establishment arrangement will always be able to enable the multiplexer/demultiplexers 53(i,j,k) to establish the connections required to form the partitions through the control network 14.

Figure 11:
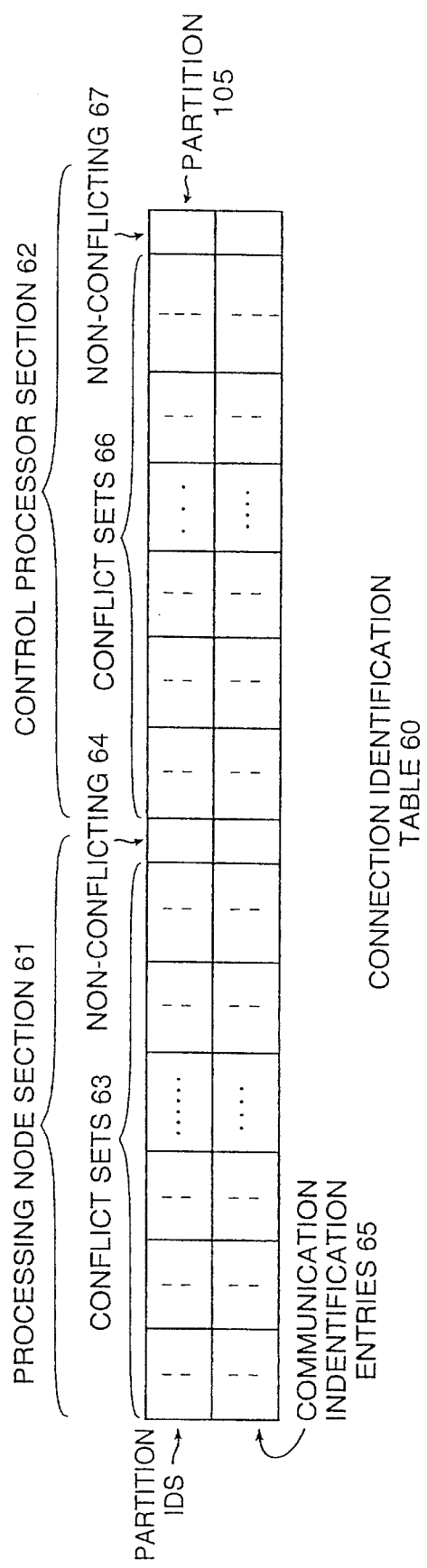
FIG. 11 depicts a data structure which is useful in understanding the operation depicted in FIGS. 10A through 10C.

With this background, the partitioning arrangement will be described in connection with the flow chart of FIGS. 10A through 18C and the data structure shown in FIG. 11. With reference to those figures, the partitioning arrangement operates in a plurality of successive iterations, in each iteration determining the conditioning of the multiplexer/demultiplexers 53(i,j,k) to establish the connections between control network node groups 51(i,j,k) at a level to the control network node groups 51(i+1,j",k") of the next higher level. Thus, with reference to FIG. 9, for example, the partition establishment arrangement will initially establish connections between control network node groups 51(i,j,k) at level two and control network node groups at level three. The connections established during the iteration from control network node groups which connect directly or indirectly to processing nodes 11 or control processors 12, to control network node groups in the next higher level, will be established:

(1) if the connections for two partitions are to be at least in part to the same control network node cluster 50(i+1,j'), they will be to different control network node groups 51(i+1,j',k'$_a$) and 51(i+1,j',k'$_b$) in that cluster, to thereby ensure that connection conflicts do not arise which can occur if they were connected to the same control network node group 51(i+1,j',k'), and (2) if there are partitions for which conflicts do not arise with respect to a control network node cluster 50(i+1, j'), in the next higher level, to further ensure that the connections will be generally evenly distributed to control network node groups of diverse values of index k', thereby to minimize the likelihood that connections will be clustered to particular portions of the control network 14 and thus maximize the distribution of connections throughout the control network 14.

The partition establishment arrangement repeats the iterations through the various levels until connections have been established to the control network node groups 51(M,0,k) at the root level. The partition establishment arrangement establishes such connections in a controlled manner, so that, if the above-described configuration rules are observed in initially setting up the partitions, the arrangement will be able to establish the connections for the partitions.

More specifically, and with reference to FIG. 10A, the partition establishment arrangement initially establishes an iteration termination criterion (step 100). As noted above, the arrangement operates in a plurality of iterations, each related to a level of the control network, and so the termination criterion will relate to the number of levels in the control network 14. Thereafter, the partition establishment arrangement establishes and initializes a level counter (step 101). The level counter will be used as an iteration counter to determine when the required number of iterations have been completed, and so its initial value will be related to the lowest level in the control network 14 at which it begins to fan out, that is the lowest level containing multiplexer/demultiplexers 53(i,j,k), which in the embodiment depicted in FIGS. 1 through 9 is at level 2.

Thereafter, the partition establishment arrangement begins the series of iterations. Initially, the arrangement identifies the particular root sub-fat-trees present in the level identified by the level counter (step 102). In the first iteration, involving level two, the lowest level at which the illustrative control network 14 described herein begin to tan out, the control network node groups 51(2,j,k) form one root sub-fat-tree. The partition establishment arrangement identifies what will be referred to herein as "conflict sets" among the processing nodes 11 and control processors 12 for the various partitions to be established (step 103). The conflict sets identify, separately for the processing node portion of the control network 14 and for the control processor portion of the control network, particular partitions connected to control network node groups 51(i,j$_a$,k) and 51(i,j$_b$,k) in level "i" which would be connected to the control network node groups 51(i+1,j',k') of the same control network node cluster 50(i+1,j') in the next higher level.

If two partitions connected to control network node groups 51 (i,j$_a$,k) and 51 (i,j$_b$,k) in level "i" would be connected to control network node groups 51(i+1,j',k') of the same parent control network node cluster 50(i+1,j'), if the multiplexer/demultiplexers 53(i,j$_a$,k) and 53(i,j$_b$,k) are suitably conditioned they will direct communications to different control network node groups 51(i+1,j',k$_c$') and 51(i+1, j',k$_d$') in the parent control network node cluster 50(i+1,j'). This will avoid a conflict which can occur if the multiplexer/demultiplexers were to be conditioned to direct communications for the two partitions to the same control network node group 51(i+1,j',k$_c$,') in the parent control network node cluster 50(i+1,j'). Accordingly, the two partitions, for which communications at the next level could be directed to a control network node group 51(i+1,j',k') of the same parent control network node duster 50(i+1,j') are referred to as forming a conflict set. As will be described below in greater detail, the partition establishment arrangement uses the conflict sets to ensure that the multiplexer/demultiplexers 53(i,j,k) of the control network node groups 51(i,j,k) for each partition in the conflict set will be controlled to connect to different control network node groups 51(i+1,j',k').

From equation Eqn. 1 above, it follows that a partition which has a processing node 11 or a control processor 12 connected, either directly or indirectly through intermediate lower-level control network node groups, to a control network node group identified by reference numeral 51(i,j,k) in level "i," it will also be connected to a control network node group in cluster 51(i+1,j') where $$j'=GI\ [j/4]\qquad\text{[Eqn. 4],}$$

where "GI" refers to the "greatest integer in" function, which is also known as the function giving the "floor" of a number. Thus, the partition establishment arrangement can identify the conflict sets by determining whether processing nodes 11 or control processors 12 of two different partitions are connected to control network node groups 51(i,j$_1$,k) and 51(i,j$_2$,k) whose indices "j$_1$" and "j$_2$" have the relation:

$$GI[j_1/4]=[j_2 4]\qquad\text{[Eqn. 5.}$$

If Eqn. 5 is satisfied in connection with control network node groups in level "i" connected directly or indirectly to any two processing nodes in respective partitions, those partitions will form a conflict set. The combination of the first and second partitioning configuration rules, along with the fact that the fan-out of the control network 14 up the tree is two, will guarantee that a partition will have a conflict with at most one other partition in the processing node portion and one other partition in the control processor portion with respect to control network node groups 51(i+1,j',k') in the parent level i+1.

It will be appreciated that, in Eqn. 5, if indices "j$_1$" and "j$_2$" are represented in conventional binary form, the partition establishment arrangement can perform the operation represented by equation Eqn. 5 by shifting the respective binary representations "to the right," that is, toward the least-significant bit of the representation, by two bits, effectively dividing by four and taking the greatest integer. Alternatively, the partition establishment arrangement can perform the operation merely by comparing the binary representations except for the two low-order bits. It will also be appreciated that the partition establishment arrangement need not perform the operation for every pair of processing nodes 11 in the system 10; it is sufficient that it perform the operation for proximate pairs of processing nodes at the ends of successive partitions.

After the partition establishment arrangement establishes conflict sets which identify the conflicts with respect to control network node groups 51(i−1,j',k') at the next higher level i−1, for partitions which it determines are not members of conflict sets at that level i−1, it iteratively continues up the tree comprising the control network 14 to identify pairs of partitions for which the relation in Eqn. 5 is satisfied at each subsequent level i+x ("x" is an integer) and up to the root level. The pairs of partitions so identified at each level i+x also form conflict sets and will be used by the partition establishment arrangement with respect to these pairs of partitions in the same manner as conflict sets identified as described above in connection with level i+1. The formation of these additional conflict sets will not be required to avoid conflicts with respect to connections to control network node groups 51(i+1,j',k') in the next higher level i+1, but instead will serve to further maximize the distribution of connections to the control network node groups in that next higher level i+1 and thus throughout the higher levels of the control network 14. It will be appreciated that, with this further establishment of conflict sets, all of the partitions will be assigned to a conflict set if there are an even number of partitions to be established, but if there are an odd number of partitions to be established there will be at most one partition which is not assigned to a conflict set in the processing node portion, and similarly at most one partition, which may be a different partition, which is not assigned to a conflict set in the control processor portion.

As noted above, the partition establishment arrangement will determine the conflict sets separately for the processing node portion of the control network 14 and for the control processor portion in step 103. This will be desirable since the ordering of the successive partitions among successive processing nodes 11 in the processing node portion of the control network 14 may differ from the ordering of the successive control processors assigned to the respective partitions in the control processor portion of the control network 14. Thus, different conflicts may arise as between partitions in the processing node portion from those that arise in the control processor portion.

After establishing the conflict sets for the respective root sub-fat-trees, the partition establishment arrangement establishes a set of connection identification tables to be used in subsequent operations, each connection identification table being related to one of the identified root-sub-fat trees identified in step 102 (step 104). The connection identification table, an example of which is shown in FIG. 11 and identified by reference numeral 60, includes two sections, namely, a processing node section 61 and a control processor section 62. The processing node section 61 includes a series of conflict slot entries 63. If the partition establishment arrangement will be establishing an odd number of partitions, the processing node section 61 will also include at most one non-conflicting slot entry 64. The slot entries are shown in the FIG. as being separated from each other by a slot separator, represented by a solid line in the FIG. The conflict slot entries 63 each have two sub-entries separated by a sub-entry separator represented by a broken line in the FIG. Each conflict slot entry 63 receives identifiers for the partitions comprising a conflict set which was identified in step 103, with each partition identifier being stored in one sub-entry. Similarly, the non-conflicting slot entry 64 receives a partition identifier for a partition which may not have been identified as being part of a conflict set. Each sub-entry of each slot entry 63 and each slot entry 64 is associated with a communication identification entry 65, which will receive a connection identification value in subsequent operations. The control processor section 62 is constructed similarly.

After establishing a connection identification table for each of the sub-fat-trees, the partition establishment arrangement selects a connection identification table 60 (step 105) and initially determines whether the table 60 includes any conflict slot entries 63 or 66 (step 106). If so, it establishes a connection identification value for one of the partitions identified in one sub-entry of the conflict slot entries 63 of one of the processing node section 61 or the control processor section 62 of the selected table 60 (step 107). The communication identification value has a selected one of two possible values, illustratively identified herein as "odd" and "even." The particular value of the communication identification value identifies, for example, whether the value of the index "k" of the control network node group 51(i+1,j',k') to be connected for the partition is to be odd or even, and thereby establishes the output conditioning of the multiplexer/demultiplexers 53(i,j$_x$, k) through 53(i,j$_y$,k) of the control network nodes 51(i,j$_x$,k) through 51(i,j$_y$,k) connected to the partition, and if the fan-out of the control network differs from two, additional values may be used for the next level communication identification value. The particular partition which is initially selected from among the conflict sets is arbitrary, as is the initially-selected communication identification value. Furthermore, whether the partition establishment arrangement initially selects the processing node section 61 or the control processor section 62 is also arbitrary. Thereafter, the partition establishment arrangement establishes in the other of the processing node section 61 or the control processor section 62 the next level connection identification of the sub-entry of the conflict slot entry 66 of the same partition (step 108). Since the partition must have the processing nodes 11 and control processor 12 both eventually be connected to the same control network node group 51 (M,0,k) in the root level, next level communication identification value in both the processing node section 61 and the control processor section 62 will have the same "even" or "odd" value in steps 107 and 108, also indicating the desired conditioning of the multiplexer/demultiplexer 53(i,j,k) of the control network node group 51(i,j,k) connected thereto.

After establishing the next level connection identification value for the selected partition in both the processor identification section 61 and the control processor section 62, the partition establishment arrangement determines whether the partition whose next level connection identification value was established in the preceding step is a member of a conflict set in the "other of the processing node section 61 or control processor section" the other partition of which has not been assigned a connection identification value (step 109). For example, if the partition establishment arrangement began with the processing node section 61 in step 107, and with a partition which will be identified as Partition A, in step 108 it would establish the next level connection identification value for Partition A in the control processor section 62. In step 109, the partition establishment arrangement will determine whether Partition A is a member of a conflict set in the control processor section 62, and if so, whether the other partition in the conflict set has not been assigned a connection identification value.

If the partition establishment arrangement makes a positive determination in step 109, it sequences to step 110 to establish the next level communication identification value for the other partition in the conflict set. Continuing with the preceding example, if the partition establishment arrangement determined in step 109 that Partition A is, in the control processor section 62, in a conflict set with Partition B, it will establish the next level communication identification value for Partition B in the control processor section 62. It will be appreciated that the partition establishment arrangement will select the next level communication identification value for Partition B to be different from that selected for Partition A in step 107.

Following step 110, the partition establishment arrangement will return to step 108 to establish the next level communication identification for the same partition in the other section of the connection identification table 60. That is, continuing with the above example, in step 108 the partition establishment arrangement will provide the next level communication identification value for Partition B in the processing node section 62. It will be appreciated that the next level communication identification value provided in the processing node section in step 108 will be the same as the value provided in the control processor section 62 in step 110.

Thereafter, the partition establishment arrangement will return to step 109 to determine whether, with reference to the above example, Partition B is a member of a conflict set in the processing node section 61, and if so will sequence to step 110. The partition establishment arrangement in steps 108 through 110 effectively toggles back and forth between the processing node section 61 and the control processor section 62, establishing the next level communication identification value for one member of a conflict set in response to the value assigned in the other section (step 110) and then establishing the value for the other member of the conflict set in response to the value assigned to the first member (step 108). These operations continue while the partition establishment arrangement makes a positive determination in step 109. At some point, the partition establishment arrangement may make a negative determination in step 109, effectively determining that a partition which is a member of a conflict set in one section 61 or 62 is either (1) not a member of a conflict set in the other section, or (2) if it is a member of a conflict set, that the other member already has been assigned a connection identification value. When that occurs, the partition establishment arrangement sequences to step 111.

In step 111, the partition establishment arrangement determines whether there are any conflict sets in either the processing node section 61 or the control processor section 62 of the selected connection identification table 60 for which one partition has a connection identification value and the other does not. This may occur, for example, with respect to the first conflict set for which the partition establishment arrangement establishes a connection identification value in step 107, since the arrangement in step 108 immediately toggles to the other of the processing node section or control processor section. With reference to the above example, if the partition establishment arrangement starts in step 107 by assigning a connection identification value to partition A in its conflict set entry 63 in the processing node section, the arrangement will in step 108 toggle to the control processor section to assign the same connection identification value to the entry 66 or 67 which identifies partition A. If partition A is in a conflict set with partition B in the control processor section 62 as described above, the partition establishment arrangement thereafter will assign a connection identification value to partition B. Accordingly, the other partition, such as partition Q, which is also identified in entry 63 as being in the conflict set along with partition A may not have been assigned a connection identification value at this point, and indeed may not be assigned a connection identification value up to the point a positive determination is made in step 109.

If the partition establishment arrangement makes a positive determination in step 111, it proceeds to identify a partition for which no connection identification value has been assigned and assign the connection identification value to the partition (step 112). It will be appreciated that the connection identification value which is assigned in step 112 will be different from the value which was previously assigned to the other partition of the conflict set. Thereafter, the partition establishment arrangement returns to step 108 to resume assigning connection identification values as described above.

If the partition establishment arrangement makes a negative determination in step 111, the partition establishment arrangement will have determined that there are no conflict sets in either the processing node section 61 or the control processor section 62 of the selected connection identification table 60 for which one partition has a connection identification value and the other does not. In response, it sequences to step 113 to 4 determine whether connection identification values have been established for partitions of all of the conflict sets of the selected connection identification table 60. If not, the partition establishment arrangement will continue assigning connection identification values to the remaining conflict sets, using the same operations as described above. Since in sequencing from step 111 to step 113 the partition establishment arrangement will have determined that, for all remaining conflict sets, none will have any previously-assigned connection identification values, it will return to step 107 to initially assign a connection identification value for a partition in a conflict set for which a value has not previously been assigned. Thereafter, the partition establishment arrangement will perform the operations described above in connection with steps 108 through 113 to continue assigning connection identification values to the remaining partitions in the conflict sets.

Returning to step 106, if the partition establishment arrangement determines in that step that the selected connection identification table 60 does not have any conflict sets, it will sequence to step 114 (FIG. 10C). Similarly, following the sequence of steps 107 through 113 depicted on FIG. 4C, when the partition establishment arrangement has finished assigning communication identification values to the conflict set entries 63 and 66, it sequences to step 114. In that step, the partition establishment arrangement establishes next level connection identification values for a partition which is not a member of a conflict set. The particular next level communication identification value assigned is generally arbitrary.

After establishing the next level connection identification values for the partitions which are not part of a conflict set, the partition establishment arrangement determines whether it has established next level connection identification values for all connection identification tables 60 (step 115). If not, it returns to step 105 to repeat the operations described above in connection with steps 106 through 114 with respect to a next connection identification table. The partition establishment arrangement accordingly iteratively performs the operation described above in connection with all of the connection identification tables 60. At some point, the partition establishment arrangement will have performed the operations in connection with all of the connection identification tables 60 established for the particular level "i," at which point it will have established all next level connection identification values for all control network node groups 51(i,j,k) at the level of height "i." When that occurs, the partition establishment arrangement will sequence from step 115 to step 116, in which it will increment the level counter, and thereafter determine (in step 117) whether the value of the level counter corresponds to the termination criterion that had been established in step 100.

If the partition establishment arrangement determines in step 117 that the value of the level counter does not correspond to the termination criterion, it will return to step 102 and repeat the operations described above in connection with steps 102 through 115 for the next level, in particular the level identified by the level counter after the incrementation in step 116. In step 102, for each subsequent level the number of root sub-fat trees (FIG. 9) will increase by the fan-out factor. In the illustrative control network 14 described herein is two so that, for the second iteration, there will be two root sub-fat trees. In the second iteration, the partitions associated with each root sub-fat-tree will be identified by the respective next level communication identification values established during the first iteration; that is, the partitions whose next level communication identification values in the first iteration are even are associated with one root sub-fat tree, while those partitions whose next level communication values are odd will be associated with the other root sub-fat-tree. Similarly, in the third iteration, there will be four root sub-fat-trees, with the partitions associated with each root sub-fat-tree being identified by the sequence of next level identification values established during both the first and second iterations. During each iteration, the partition establishment arrangement will identify the conflict sets (step 103) in the same manner as described above, separately for each root sub fat tree.

At some point in the sequence of iterations, the partition establishment arrangement will, in step 117, determine that the level counter, incremented as set forth in step 116, will have a value that corresponds to the termination criterion established in step 100. At that point, the partition establishment arrangement will have established next level communication identification values for all levels controllable levels, that is, from the lowest at which the control network 14 fans out, up to one level below the root level, and thus may exit (step 118). Thereafter, the partition establishment may control the multiplexer/demultiplexers 53(i,j,k) at each level, in one embodiment through the diagnostic network 16, to enable each control network node group 51(i,j,k) to communicate with a parent group 51 (i,j,k) of the parent control network node cluster 50(i,j).

The partition establishment arrangement may be in the form of a suitably-programmed computer, such as one of the control processors 12 or a diagnostic processor (not shown) for controlling the diagnostic network 16. Alternatively, the arrangement may comprise special purpose hardware. While the arrangement has been described in connection with a control network 14 which has a uniform fan-out of two beginning with the second level, it will be appreciated that the arrangement may also be used in connection with a control network 14 which has a fan-out other than two, and with a non-uniform fan-out, with modifications which would be readily apparent to those skilled in the art.

In addition, while the system 10 has been described such that the processing node portion of the control network connects only to processing nodes 11, and such that the control processor portion connects only to control processors 12, it will be appreciated that each portion may connect to various types of units, including control processors, processing nodes and input/output processors. The partition establishment arrangement establishes the partitions with respect to the various portions of the control network without regard to whether they connect to processing nodes, control processors or input/output processors or some mixture thereof.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A partition establishment arrangement for use in connection with a computer system comprising a plurality of processors interconnected by a communications network comprising a plurality of communications nodes connected in a series of levels, with the communications nodes of at least some of the levels being controllable to connect to multiple ones of the communications nodes in a subsequent level, the partition establishment arrangement determining the controlling of the communications nodes to facilitate the partitioning of the processors into a plurality of partitions, the partition establishment arrangement comprising:

A. a conflict set identifier for identifying conflict sets of processors to be assigned to respective partitions at a level, each conflict set identifying partitions for which, at a selected level, processors from different partitions may be connected to the same communications nodes in the next level;

B. a level processing portion for determining at the selected level a control value for controlling the communications nodes in response to the conflict sets identified for the level so that the communications nodes in the selected level that are connected to processors in different partitions in a conflict set are connected to different communications nodes in the next level;

C. an iteration controller for controlling the operations of said conflict set identifier and said level processing portion in a plurality of successive iterations relating to respective ones of said successive communications network levels; and D. partition enabling means for controlling the communications nodes in response to the control values generated by the level processing portion thereby to establish a plurality of said partitions.

2. A method for use in connection with a computer system comprising a plurality of processors interconnected by a communications network comprising a plurality of communications nodes connected in a series of levels, with the communications nodes of at least some of the levels being controllable to connect to multiple ones of the communications nodes in a subsequent level, the method determining the controlling of the communications nodes to facilitate the partitioning of the processors into a plurality of partitions, the method comprising the steps of:

A. identifying conflict sets of processors to be assigned to respective partitions at a level, each conflict set identifying partitions for which, at a selected level, processors from different partitions may be connected to the same communications nodes in the next level;

B. determining at the selected level a control value for controlling the communications nodes in response to the conflict sets identified for the level so that the communications nodes in the selected level that are connected to processors in different partitions in a conflict set are connected to different communications nodes in the next level;

C. controlling the conflict set identification operation and control value operation in a plurality of successive iterations relating to respective ones of said successive communications network levels; and D. controlling the communications nodes in response to the control values generated by the level processing portion thereby to establish a plurality of said partitions.

* * * * *